United States Patent [19]
Gauer

[11] Patent Number: 4,827,620
[45] Date of Patent: May 9, 1989

[54] FRAMER

[76] Inventor: Glenn G. Gauer, 2414 NE. 46th Ave., Portland, Oreg. 97213

[21] Appl. No.: 46,721

[22] Filed: May 7, 1987

Related U.S. Application Data

[63] Continuation-in-part of Ser. No. 862,130, May 12, 1986, Pat. No. 4,704,796, and a continuation-in-part of Ser. No. 914,058, Oct. 1, 1986.

[51] Int. Cl.$^4$ ............................................... G01B 3/00
[52] U.S. Cl. .................. 33/1 B; 33/DIG. 9; 355/74
[58] Field of Search ............. 33/1 B, DIG. 9; 355/40, 355/74

[56] References Cited

U.S. PATENT DOCUMENTS

| | | |
|---|---|---|
| 855,121 | 5/1907 | McCormick . |
| 1,038,771 | 9/1912 | Loving . |
| 1,096,345 | 5/1914 | Banfill . |
| 1,583,355 | 5/1926 | Kottenbach . |
| 1,679,927 | 8/1928 | Bell et al. . |
| 1,799,818 | 4/1931 | Hopkins . |
| 1,976,278 | 10/1934 | Cook ........................... 33/DIG. 9 X |
| 2,246,920 | 6/1941 | Kromholz .................. 33/DIG. 9 X |
| 2,342,525 | 2/1944 | Berry ..................... 355/74 |
| 2,494,077 | 1/1950 | Wilkinson . |
| 2,534,961 | 12/1950 | Dunn . |
| 2,560,937 | 7/1951 | Ens . |
| 2,702,944 | 3/1955 | Lane et al. . |
| 2,782,513 | 2/1957 | Brandt . |
| 3,089,384 | 5/1963 | Baasner . |
| 3,203,334 | 8/1965 | Wilson et al. . |
| 3,346,960 | 10/1967 | Miles . |
| 3,620,624 | 9/1969 | Van Acker . |
| 4,171,573 | 10/1979 | Picciotto . |
| 4,190,357 | 2/1980 | Kostiner . |
| 4,241,994 | 12/1980 | Ryan, Jr. . |
| 4,284,349 | 8/1981 | Beasley et al. . |
| 4,320,965 | 3/1982 | Kimura et al. . |
| 4,325,630 | 4/1982 | Kimura et al. . |
| 4,417,359 | 11/1983 | Baliozian .................... 33/DIG. 9 X |
| 4,460,271 | 7/1984 | Lymperis ............................. 355/74 |
| 4,467,371 | 8/1984 | Kobayashi et al. . |
| 4,482,924 | 11/1984 | Brownstein . |
| 4,704,796 | 11/1987 | Gauer . |

Primary Examiner—Harry N. Haroian
Attorney, Agent, or Firm—Klarquist, Sparkman, Campbell, Leigh & Whinston

[57] ABSTRACT

A framer is disclosed for selecting and defining the position of a portion of a visual work. The framer may include a frame defining aperture which may be moved relative to the work to place the aperture over the selected portion of the work and communication indicia for denoting the position of the aperture relative to selected boundaries or references on the work.

19 Claims, 8 Drawing Sheets

FIG. 5
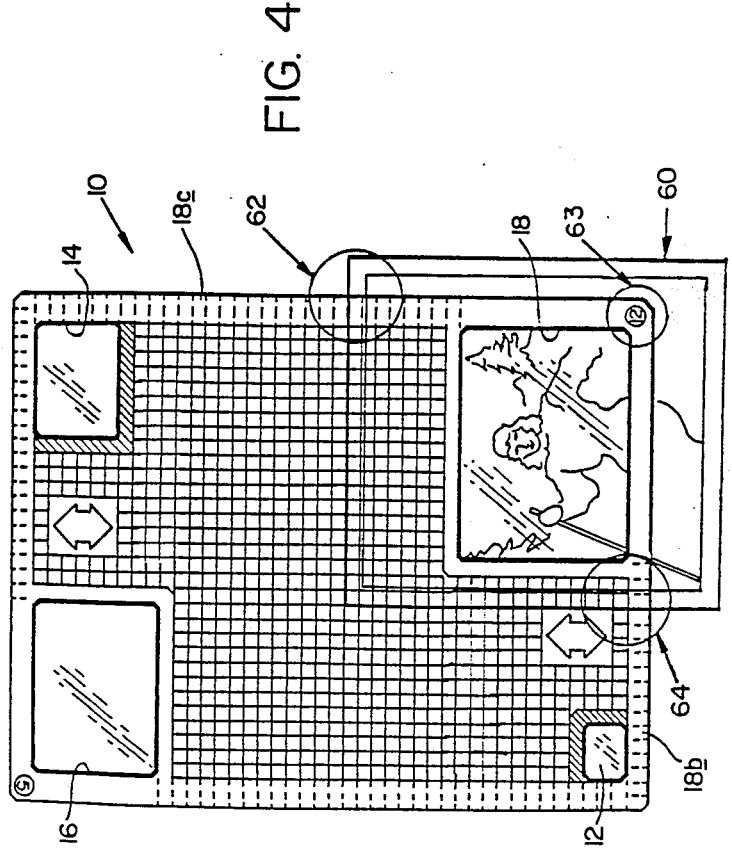
FIG. 4
FIG. 4A
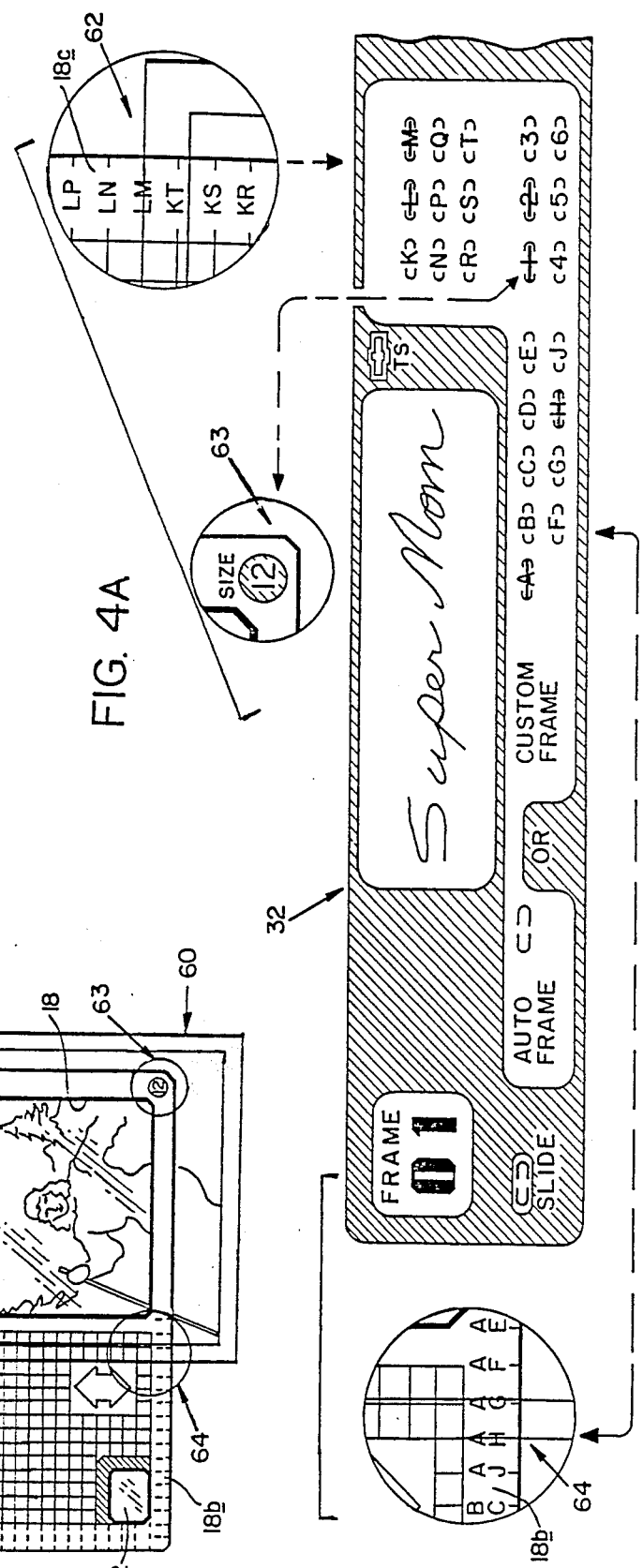

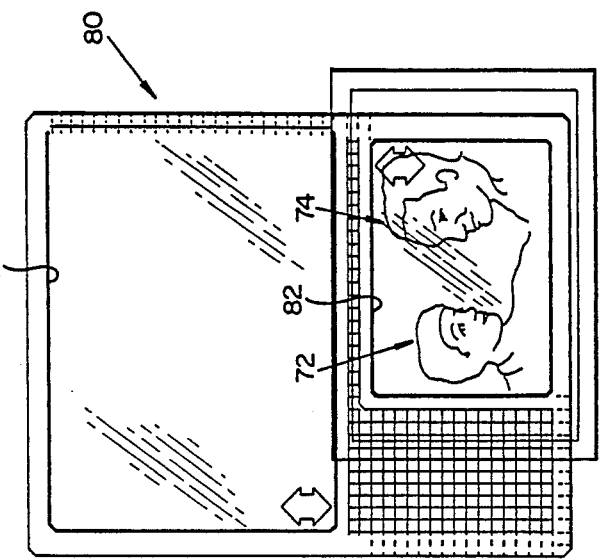
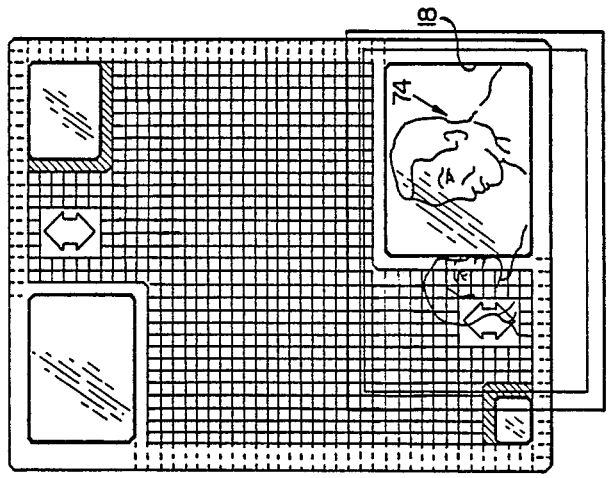
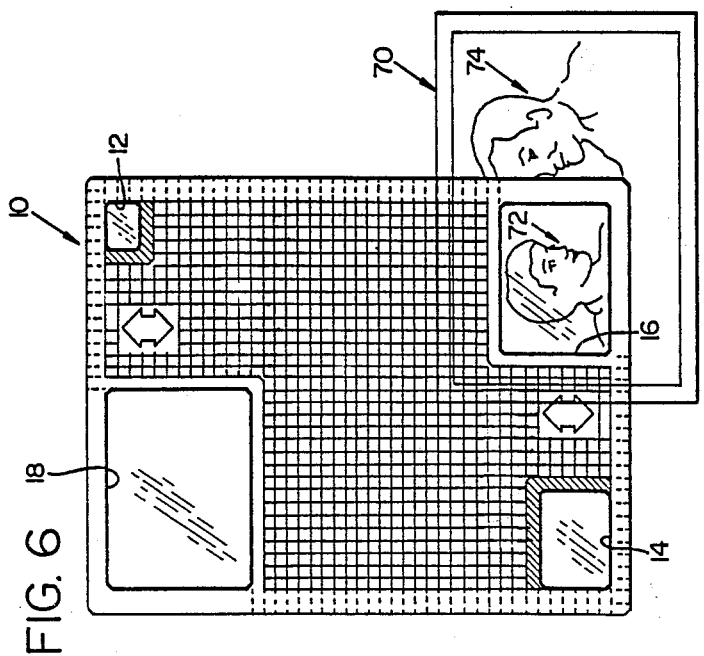
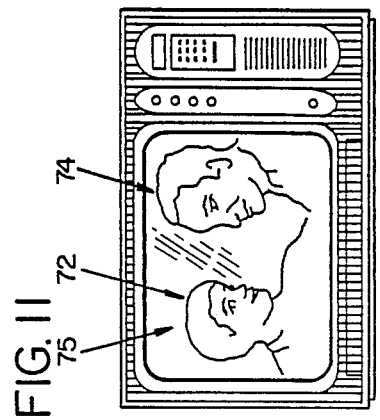
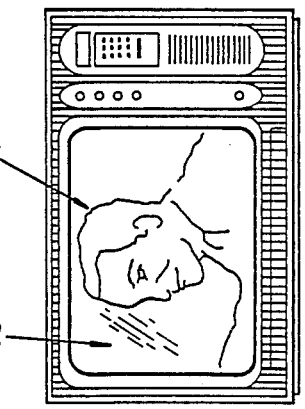
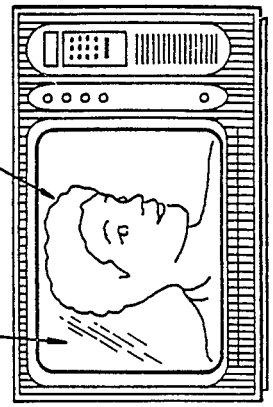

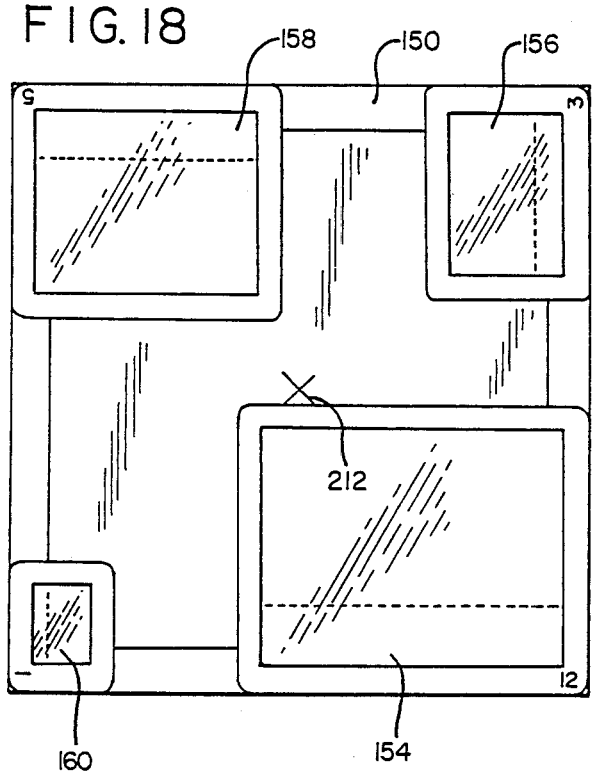
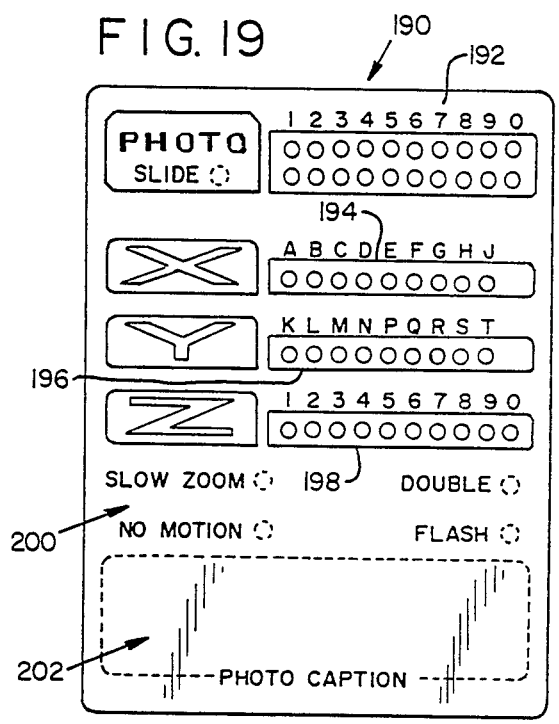
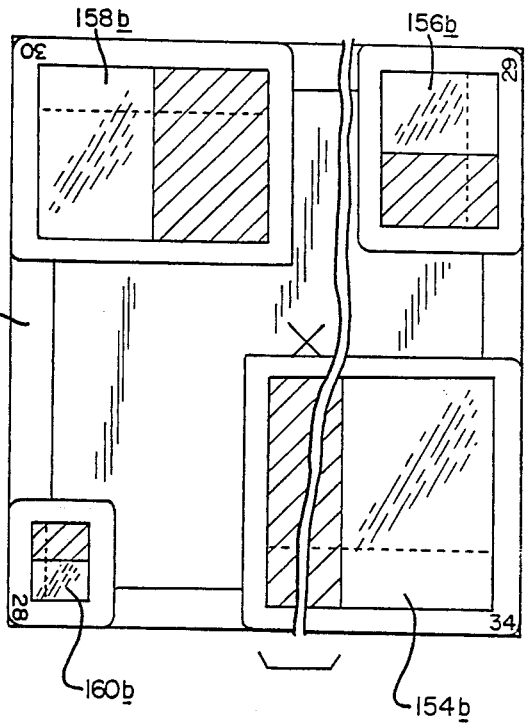
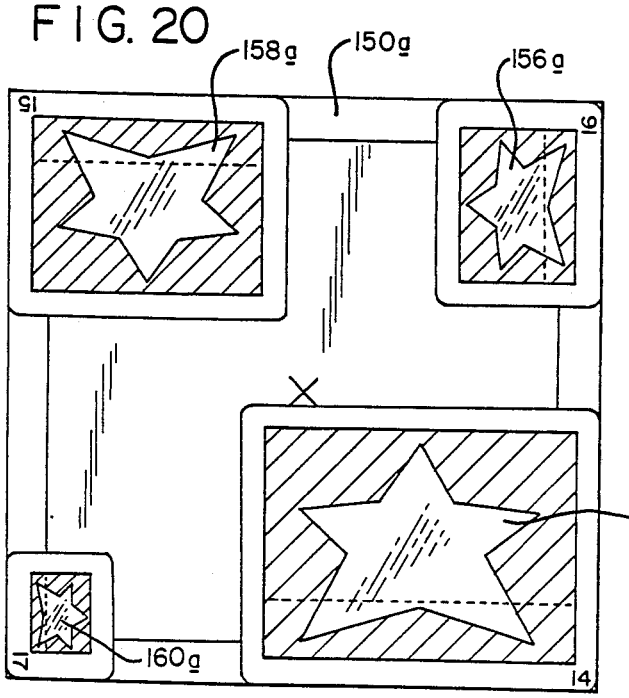

FRAMER

CROSS REFERENCE TO RELATED APPLICATION

This application is a continuation-in-part of application Ser. No. 862,130, filed May 12, 1986, of Glenn G. Gauer and entitled FRAMER and a continuation-in-part of application Ser. No. 914,058, filed Oct. 1, 1986, of Glenn G. Gauer and entitled VIDEO PRODUCTION SYSTEM AND METHOD.

BACKGROUND OF THE INVENTION

This invention relates to a system for selecting and defining the position of a portion of a visual work.

When working with visual media, such as photographs, artwork, graphs, etc., often it is desirable to be able to select a portion, or portions, of such work, in some way denote and define precisely the locations of the selected portions of the overall work, and record and/or communicate such, either for one's own use or for another. An example of where this would be advantageous is where one has a large photograph and wishes to select only a portion thereof for use in a final work. Also it can be used to define the relative positions of multiple portions of a single work.

SUMMARY OF THE INVENTION

An object of the present invention is to provide a novel and simple apparatus which accomplishes this task in a precise manner.

A more specific object of the present invention is to provide a novel framer for selecting and defining the position of a portion of a visual work whereby such position may be communicated for subsequently relocating the selected portion in a very precise manner.

Yet another object of the invention is to provide a novel system and method for defining and communicating the position of a selected work.

More specifically and without limiting the scope of the invention, one specific form of a framer in accordance with the invention comprises an overlay having a visual aperture of a preselected size and proportion capable of being placed over the visual work and moved relative thereto to place the aperture over a selected portion of the work, and communication, or notation indicia positioned on the overlay for denoting the position of the overlay and its included aperture relative to the selected boundaries, borders or other reference portions of the work. The framer may include more than one visual aperture and corresponding indicia may be included on the framer. Still another specific framer in accordance with the invention has a visual aperture which is variable in size, has a novel mechanism for varying the aperture size, yet which retains a consistent proportionality throughout its intended range of size variability. A further specific framer in accordance with the invention includes a base with communication indicia and which may have a visual window, together with an overlay with at least one such visual aperture. The base and overlay are cooperatively used to denote the position of the visual aperture relative to the work.

Again without limiting the scope of the invention, an illustrative system in accordance with the invention includes a framer with a visual aperture which may be placed over a selected portion of the work, communication indicia on the framer for denoting the position of the aperture relative to the work, and recording means for recording the indicia and communicating the same to permit subsequent precise location of the selected portion of the work at a later time.

These and other objects, features and advantages of the invention will become more fully apparent with reference to the following description and drawings.

BRIEF DESCRIPTION OF THE DRAWINGS

FIGS. 4, 4a and 5 illustrate a use of and a product resulting from use of a system shown in the prior figures;

FIGS. 6–14 illustrate further uses and results of use of a system as set out in FIGS. 1–3;

FIGS. 12 and 13 illustrate a modified embodiment of the invention;

FIG. 14 is an enlarged cross-sectional view taken along line 14–14 in FIG. 13;

FIGS. 18, 20 and 21 illustrate exemplary overlays for use in the framer of FIG. 16;

FIG. 19 illustrates one of a series of alternate recording means used to record and communicate information determined by use of the framer of FIG. 16.

DESCRIPTION OF THE PREFERRED EMBODIMENTS OF THE INVENTION

Preferred embodiments of the invention will be described herein as examples of selecting portions of still photographs for incorporating into a video display production. Due to the generally defined height-to-width proportionality of a video screen, the proportions of the selected parts of the work discussed herein are illustrated and described in height-to-width ratios corresponding to those found on a video display screen.

It should be recognized, however, that this invention has applications far beyond that described herein, and is adapted for use in selecting and denoting the location of selected portions of a variety of visual media.

Figure 1:
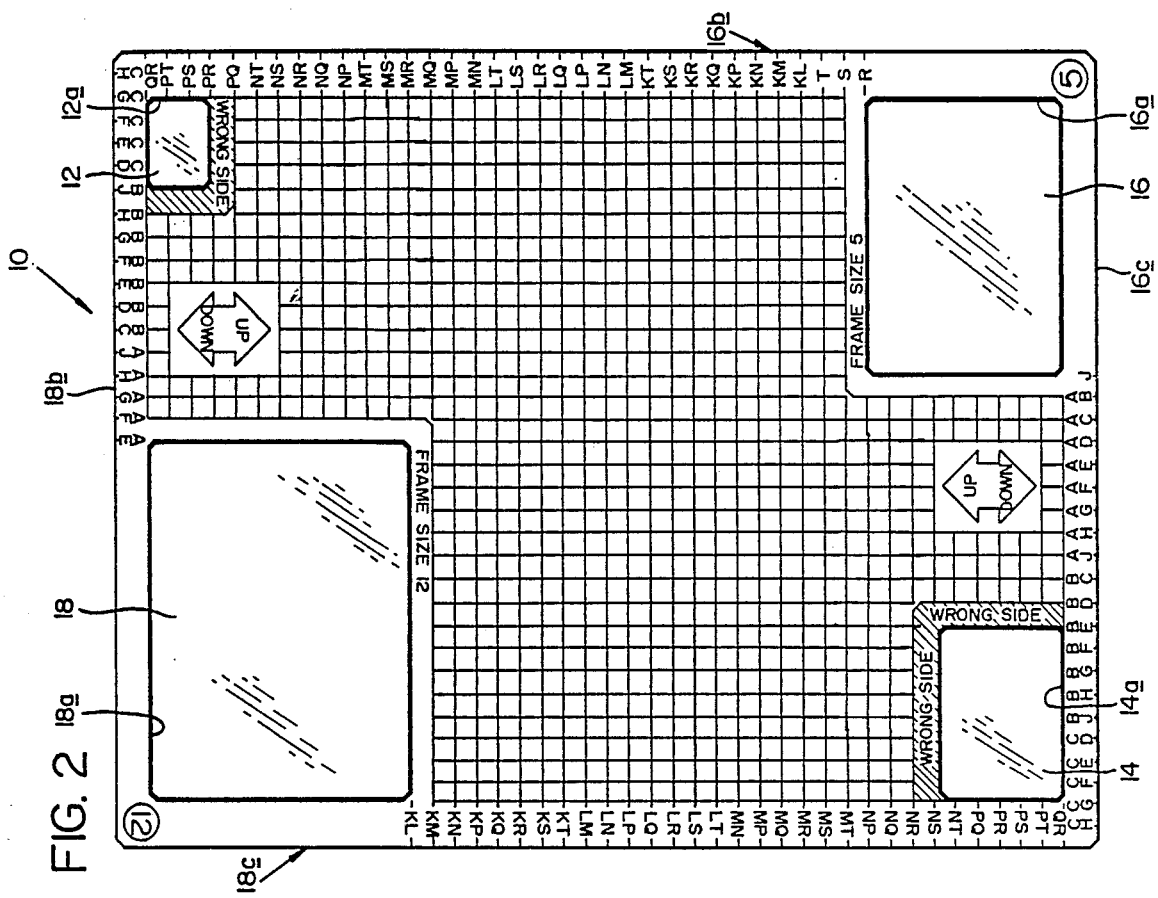
FIG. 1 is a view of one face of a form of overlay comprising a portion of an embodiment of the invention.
Figure 2:
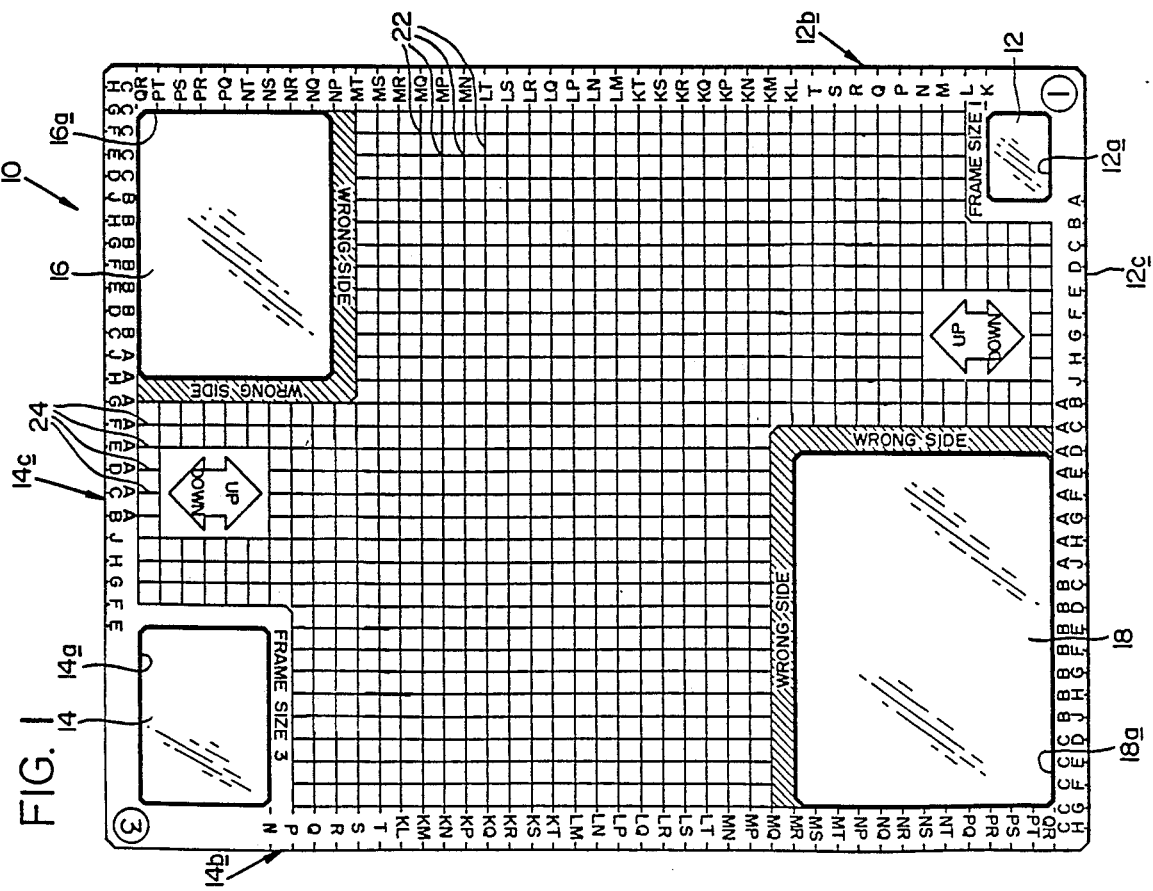
FIG. 2 is a view of the opposite face of the overlay of FIG. 1.

Referring first to FIGS. 1 and 2, these illustrate opposite sides of a transparent unitary framing overlay sheet 10. The sheet includes four transparent visual apertures 12, 14, 16 and 18 defined by borders 12a, 14a, 16a and 18a.

Adjacent the boundaries of each of these apertures is a notation as to the frame size number on one side of the sheet, and on the other side of the sheet is a notation, "Wrong Side." These are to indicate to the user which side of the sheet should be facing up (toward the user) during use. The user should be able to see the frame size number when in use.

Each of the apertures is of a different size and is proportioned in the same height-to-width ratio as a common video display screen for this example.

Remainder portions of transparent sheet 10 intermediate apertures 12, 14, 16 and 18 are imprinted with a plurality of perpendicularly disposed horizontal and vertical gridlines 22, 24 respectively.

Arrayed around the border of sheet 10 are a series of letters in ascending order, each of which is adjacent the end of one of the gridlines. These are referred to herein as communication, or notation, indicia. Each aperture has its own discrete set of such notations. For example, aperture 12 has indicia 12b, 12c associated therewith, and apertures 14, 16, 18 have indicia 14b, 14c, 16b, 16c and 18b, 18c, respectively. Although alphabetic indicia are illustrated, it should be recognized that numeric, or another symbolic type of communicating indicia by which information can be transmitted, may be used also.

In FIG. 2, and referring to aperture 18 (frame size 12), it will be noted that adjacent the aperture are alphabetic indicia AE-CH extending along the horizontal axis, and alphabetic notations KL-QR extending along the vertical axis.

Figure 3:
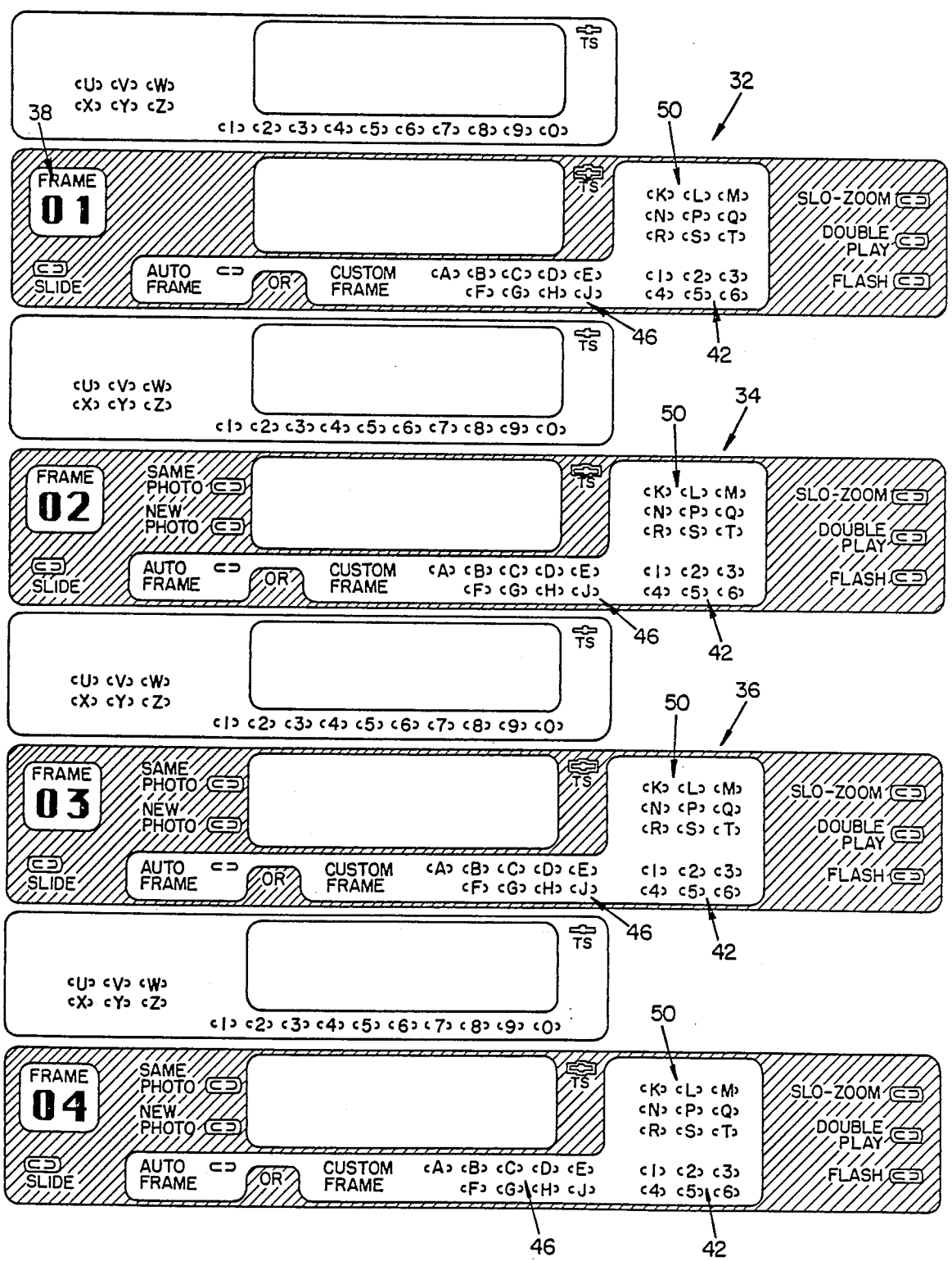
FIG. 3 illustrates a series of recording means used to record and communicate information determined by use of the framer of FIGS. 1 and 2.

Referring to FIG. 3, a plurality of recording, or communicating, means 32, 34, 36 are illustrated. These include elongate cards, or slips, having boxes defined thereon into which information can be entered. In the upper left-hand corner of card 32 is a picture frame notation 38 to denote the picture with which the recording card is to be used. In the central region of the card are numerals 1-6 in markable boxes at 42. These correspond to the frame size notations or frame identifier notations, such as previously described for apertures 12, 14, 16 and 18; (i.e. aperture 16 is frame size 5).

To the left of numerals 42 are alphabetic notations A-J in boxes 46. Above the numeral designations 42 are alphabetic notations K-T in boxes 50.

The boxes in which each of the numerals, or alphabetic letters, is confined may be manually marked for communicating information regarding the selected frame, as will be described below.

Describing a method of operation using the apparatus, reference is made to FIGS. 4 and 5. A user may have a photograph such as noted at 60, here a photograph of a skier in mountainous terrain. However, the user may wish to use only a small portion of this overall photograph. The present invention allows the user to select a specific portion of the photograph, denote the precise location of the selected portion, and to record and/or communicate that information.

Referring to FIGS. 4 and 4a, the user places overlay sheet 10 on, or in front oil, the photograph. The amount of photograph 60 to be used is determined by which of apertures 12, 14, 16, 18 are positioned over the selected portion of the photograph, recognizing that the apertures vary in size. In this illustration, aperture 18 (frame size 12) is used. When the user has positioned the aperture to set off the desired section of the photograph, the location is easily determined by noting at 62, 64 the position of the border or other selected reference (i.e. the margins of the imprinted portion of the photograph or a reference corner of the photograph) on the photograph 60 relative to the alphabetic notations along the borders of overlay sheet 10. The aperture size is noted at 63.

The user merely reads the alphabetic notations on the horizontal and vertical borders as illustrated and then records the same on the recording card to be associated with that photograph. In this instance, it will be noted that on card 32 in FIG. 4a the frame size has been marked as 1-2 (to denote frame size 12), the lower, horizontal, border notation is marked as AH, and the right side, vertical, alphabetic notation is marked as LM, conforming to the locations denoted by indicia 18b, 18c.

By using a manually marked communicating and recording medium as noted here, the information as to the size and position of the selected portion of the photograph can be transmitted easily and precisely for further use. For example, the card may be machine readable by an optical scanner to control a computer-operated animation camera. This can precisely locate the selected portion of the photograph to place it on video tape for projection on a video screen picture 68 as illustrated in FIG. 5.

Explaining further, a user can easily take a photograph as illustrated at 60, and with the use of an aperture in the transparent overlay sheet select a portion of the photograph to be used. The position of the selected portion is noted by the notation indicia at the edges of the overlay sheet. This can be recorded and communicated easily by use of the recording cards described. This information then can be used subsequently by others to relocate that exact portion of the photograph.

In the example set out above the user has selected the portion of photograph 60 which shows only the upper portion of the skier. The precise location of this portion of the photograph has been communicated by the border notation indicia. With this information the same user, or another, can precisely relocate the selected portion to capture it on video tape, or in another format if desired. In FIG. 5 the selected portion has been put on video tape and is shown in replay.

FIGS. 6-11 illustrate additional uses of this system.

In FIG. 6, a photograph 70 including two subjects 72, 74 is shown.

In FIG. 6, sheet 10 is illustrated in position overlaying photograph 70 with aperture 16 positioned over subject 72. In this manner the user can select only a portion of one subject in the photograph. By noting the horizontal and vertical alphabetic notations along the border, as previously described, this information can be communicated to a subsequent user to obtain the segregated image on videotape as illustrated in FIG. 9 on video screen 75.

Similarly, by moving overlay sheet 10 to a position where aperture 18 overlies subject 74 and noting the position of the overall work in relation to the boundary notations, a subsequent user can segregate subject 74 as illustrated in the video image at FIG. 10. The notations developed in the FIG. 6 and FIG. 7 applications also serve to denote the relative positions of selected portions on a single work. For example, this information on relative positions of multiple selected portions within the single work could be used to develop a path for a camera to follow in scanning from the image in FIG. 9 to the image in FIG. 10.

FIG. 8 illustrates use of another overlay sheet 80 with larger transparent apertures 82, 84. This overlay includes a gridwork pattern imprinted thereon and alphabetic notations along its borders for use with these larger apertures. Apertures 82, 84 are of such size as to accommodate both subjects 72, 74 with information being able to be communicated to produce a visual image as illustrated in FIG. 11.

Thus, it will be seen that by use of this apparatus and method a user can precisely select and locate a portion of a visual work and record or communicate the same for subsequent use.

Figure 12:
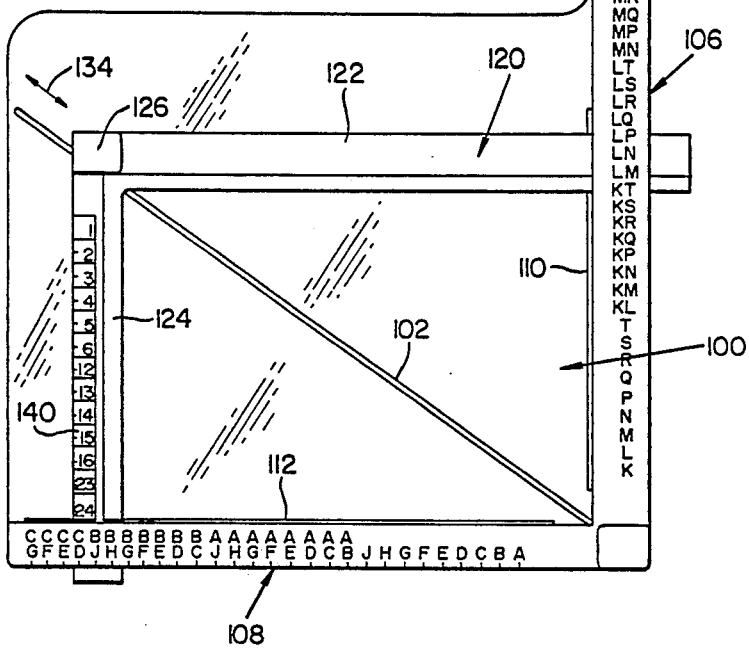
Figure 13:
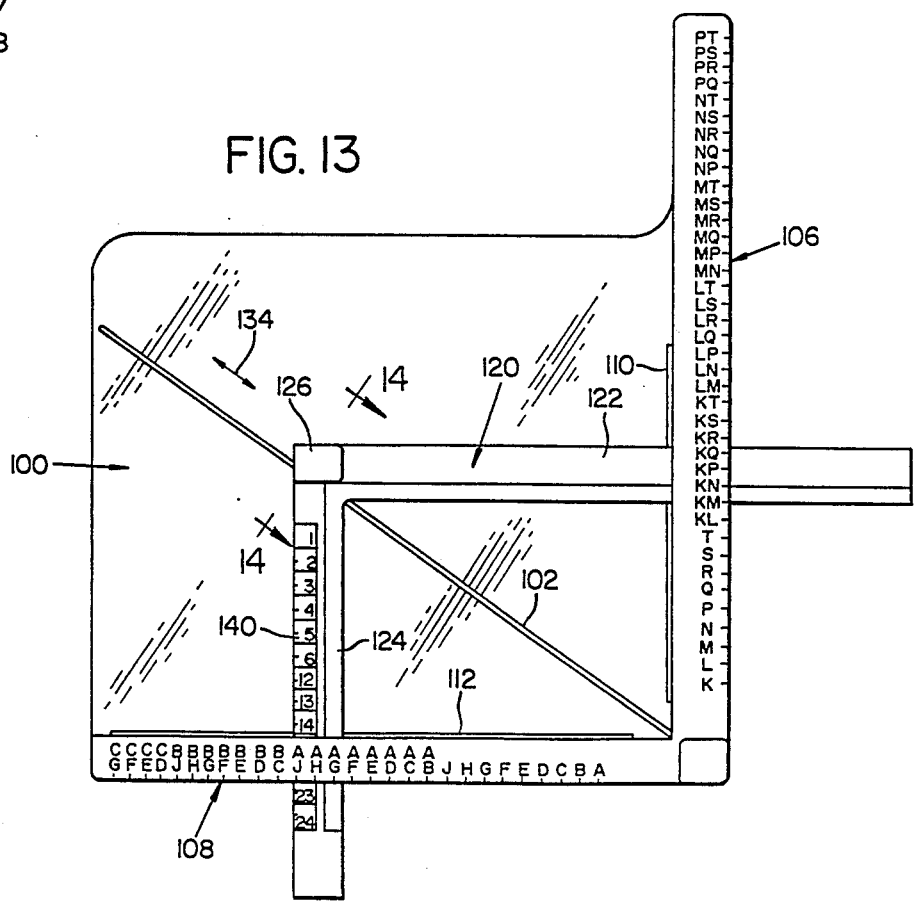

FIGS. 12 and 13 illustrate another embodiment of the invention. In this instance the aperture size is variable, while the height-to-width proportionality of the aperture is maintained in a preselected ratio, or proportionality, throughout variability in size of the aperture.

Explaining in greater detail, a substantially transparent overlay sheet 100 is provided, having an essentially straight-line slot 102 formed therein.

Arrayed along regions disposed substantially perpendicularly to each other and along the borders of sheet 100 are boundary, or border, symbolic indicia 106, 108 similar to that previously described along the borders of aperture sheet 10.

A pair of elongate slits 110, 112 extend through portions of the overlay sheet 100 adjacent to boundary notations 106, 108 respectively.

A second, or L-shaped, member, or element, 120 is mounted on overlay 100. Element 120 has perpendicularly disposed legs 122, 124. As is seen, these extend through slits 110, 112.

Figure 14:
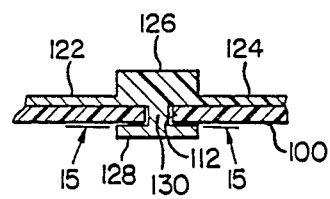
Figure 15:
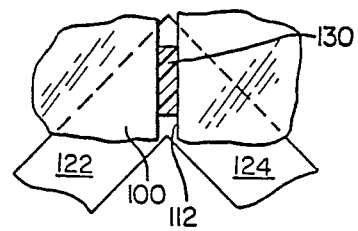
FIG. 15 is a view taken along line 15–15 in FIG. 14.

At the vertex between legs 122, 124 is means to aid in mounting element 120 on sheet 100 while allowing movement therebetween. This is better illustrated in FIG. 14 and 15. In FIG. 14, it will be seen that an enlarged portion 126 joins to and projects upwardly from the juncture of legs 122, 124. A holding portion 128 which is wider than slot 102 underlies marginal edge portions of slot 102 in sheet 100. An elongate neck portion 130 joins portions 126, 128 and fits slidably in slot 112.

This construction allows the L-shaped element 120 to be moved relative to sheet 100 along the direction of slot 102 as indicated by dual-headed arrow 134. Such movement of element 120 relative to element 100 varies the size of the aperture defined between slits 110, 112 and the inner edges of legs 122, 124 while maintaining a preselected height-to-width ratio, or proportionality.

Arrayed along leg 124 of element 120 are a series of numerical indicia which indicate the size of the aperture at any given position of element 120 relative to overlay sheet 100. For example, in FIG. 12 the aperture size would be noted as 24, whereas in FIG. 13 where the aperture size has been reduced, it would be an aperture size 14.

Use of the variable aperture size framer illustrated in FIGS. 12-15 is similar to that previously described for the prior embodiment of the invention.

FIGS. 16-21 illustrate another embodiment of the invention together with a use of this embodiment. In this instance, the framer is comprised of an overlay such as overlay sheet 150 together with a base such as base sheet 152.

The overlay has four transparent visual apertures 154, 156, 158 and 160 defined by borders 154a, 156a, 158a and 160a. Adjacent boundaries of each of these apertures is an aperture identifying indicia, or notation. This latter indicia may correspond to the frame or aperture size or designate that a particular specialized aperture is being used, such as one of the apertures of the FIGS. 20 and 21 overlays. One such aperture identifying indicia is indicated at 162. Like the FIG. 1 form of framer, each of the apertures 154-160 is typically of a different size and is proportioned in the same height-to-width ratio as a common video display screen for this example. These visual apertures, which may comprise transparent portions of sheet 150 or openings in this sheet, are capable of being placed over a photograph or other visual work as explained in the preceding examples and moved relative to the work to position a selected one of these apertures over a desired portion of the work. These visual apertures are therefore areas through which viewing of the visual work is permitted. Equivalently, slides may be projected on a screen and the overlay shifted to select a particular portion of the projected slide.

Typically areas of the overlay, such as 164, spaced from the edge margins of the overlay and not included within the boundaries of the apertures are opaque. As a result, a user of the device can more readily concentrate solely on the portion of the work visible through the selected aperture.

Figure 16:
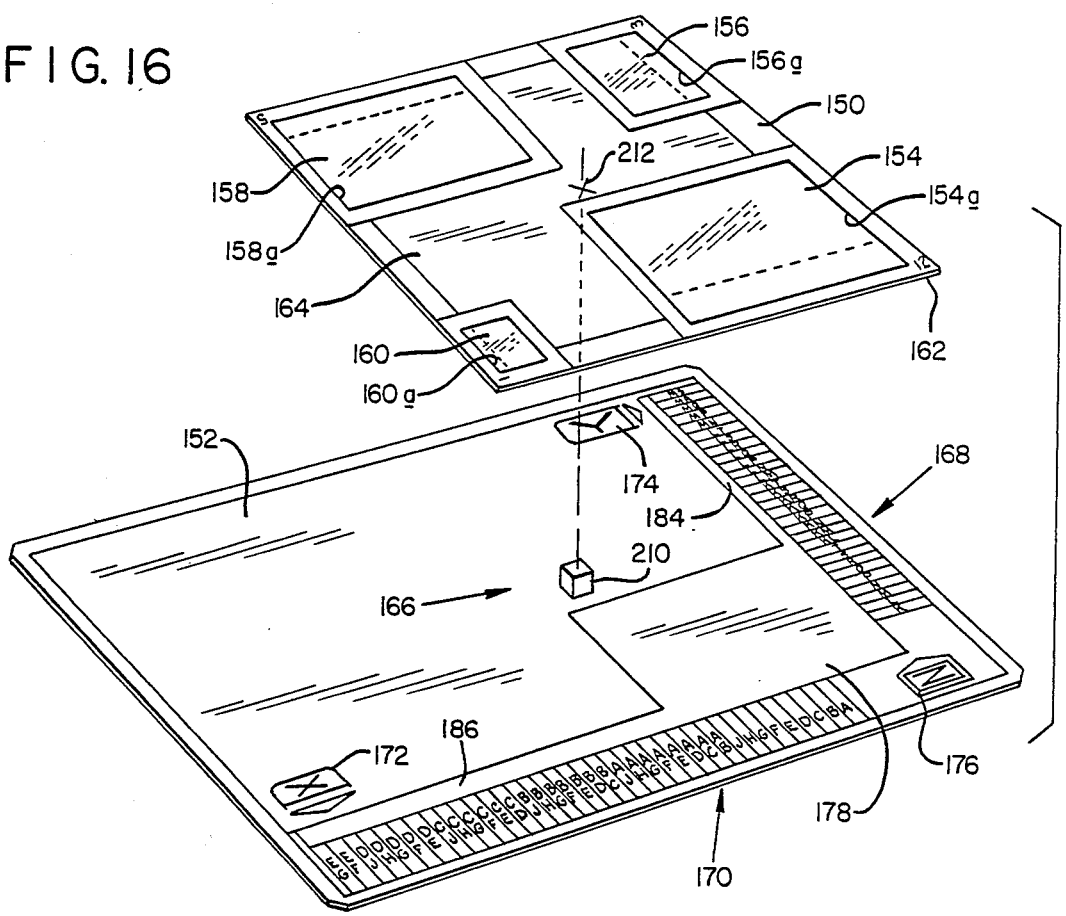
FIG. 16 is an exploded view of a modified embodiment of a framer in accordance with the present invention.

The FIG. 16 form of framer includes a positioning means or mechanism for orienting or locating the overlay 150 on the base 152. The overlay is located with a desired aperture 154-160 in a known position relative to the base so that communication or notation indicia on the base, as explained below, are properly positioned and associated with the selected aperture. One form of locating or positioning mechanism is indicated generally at 166 in FIG. 16 and is described in greater detail below.

Base 152 has communication or notation indicia such as 168, 170, positioned along at least two regions thereof and disposed at substantial angles relative to each other. These communication indicia are used in denoting the position of a selected aperture relative to borders or other such references on the work when the selected aperture is in the known or first position relative to the indicia and has been moved to overlay the desired portion of the work.

Figure 17:
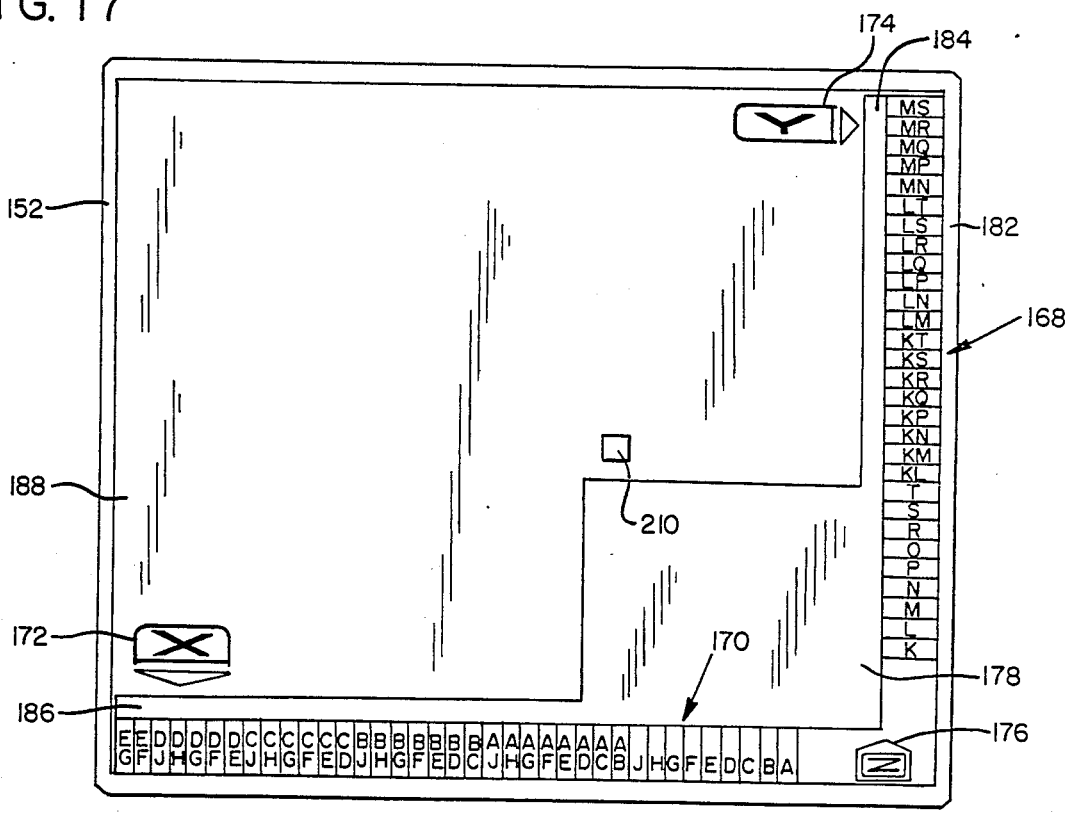
FIG. 17 is a top plan view of the base portion of the framer of FIG. 16.

The illustrated indicia 168, 170 comprise a series of letters in ascending order spaced equally apart along the respective right and lower edges of the base as shown in FIGS. 16 and 17. Again, although alphabetic indicia are illustrated, numeric or other symbolic communicating indicia by which the information can be transmitted may also be used, as in the case of the other forms of framer previously described.

Figure 22:
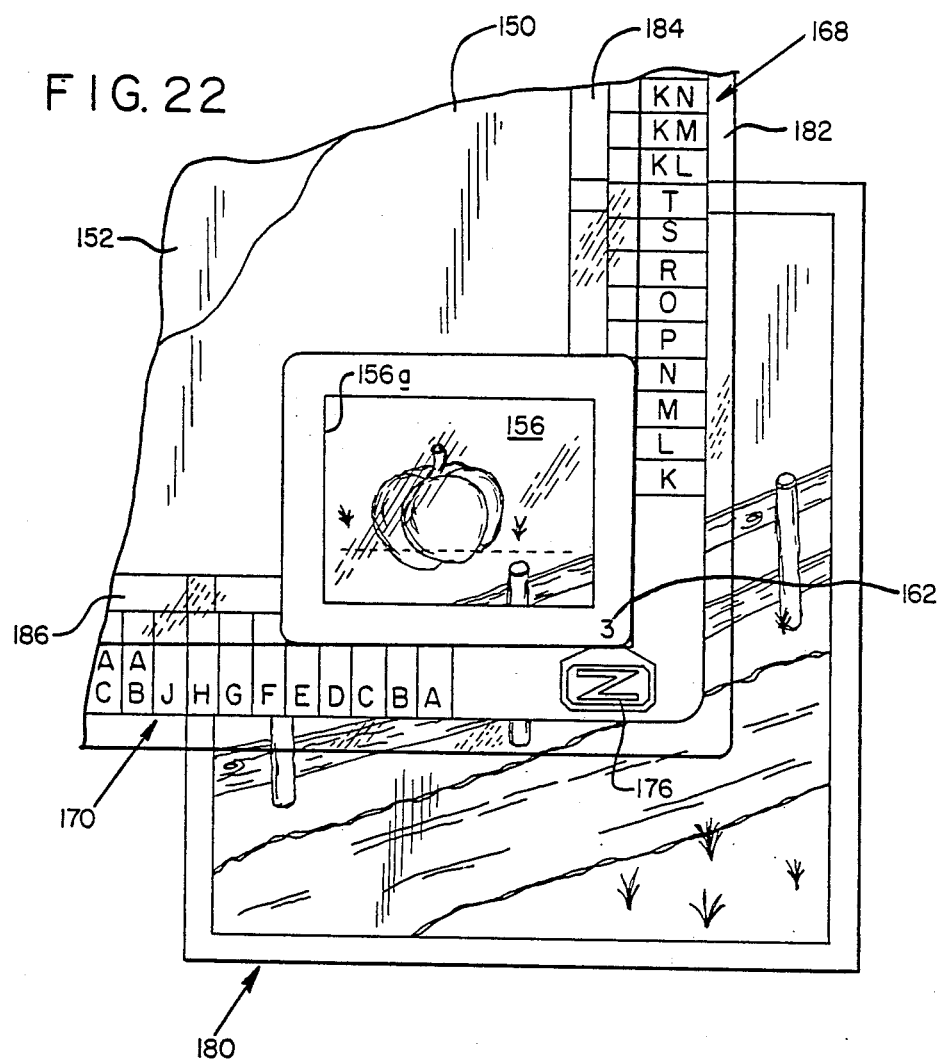
FIG. 22 illustrates a use of the framer of FIG. 16.

The series of letters comprising the indicia 168 do not duplicate and are distinct from the series of letters making up indicia 170. Although this is not required, it does minimize the possibility of confusing the indicia from 168 with those of 170, for example, when information is recorded. To further reduce the possibility of misrecording the data, a first or X identifier indicia 172 is associated with the communication indicia 170 along a first margin or axis of base 152. Also, a second or Y identifier indicia 174 is associated with the communication indicia 168 along the second margin or axis of base 152. In addition, a third or Z identifier indicia 176 is located in the corner of base sheet 152 at the intersection of indicia 168, 170. This last identifier indicia 176 is associated with the aperture identifying indicia 162. For example, as shown in FIG. 22 and described below, the Z identifier indicia 176 is pointed to the frame identifying indicia 162 when visual aperture 156 of overlay 150 is in position for use.

As shown in FIGS. 16 and 17, the base 152 includes a visual window 178 defined therein and positioned to substantially underlie one of the apertures 154-160 when the selected one of such apertures is positioned with communication indicia 168, 170 along the side of the selected aperture. Typically, the visual window 178 is sized to be generally at least as large as the largest visual aperture 154–160. Consequently, when the visual apertures and visual-window are aligned, the base sheet may be moved over a photograph or other visual work to position the selected visual aperture over the desired portion of the work. The desired portion of the work is then visible through both the visual aperture and the visual window. Like the visual apertures, the visual window may comprise openings or areas through which the visual work can be viewed.

The edge margins 182 of base sheet 152 are typically transparent. In addition, elongated transparent areas 184, 186 adjoin the respective indicia 168, 170. Apart from identifiers 172, 174 and 176, the remaining portion 188 of base sheet 152 is typically opaque. This helps a user of the apparatus to focus on portions of a photograph or other visual work visible through window 178 and the overlying visual aperture, as opposed to focusing on extraneous undesired portions of the work.

Use of the framer of FIG. 16 is similar to that previously described for the prior embodiments of the invention. However, such use will be briefly described with reference to FIGS. 19 and 22.

Referring to FIG. 19, one of the plurality of recording or communicating means 190 is illustrated. Alternately, means as shown in FIG. 3 may also be used. The recording means 190 may comprise an elongated card or slip having boxes defined thereon into which information can be entered. In the upper section of card 190 is a photograph or slide notation section 192 which is used to denote the visual work with which the recording card 190 is to be used. In the central region of the card are respective marking sections 194, 196 and 198 associated with the X, Y and Z identifiers. The marking section 194 has alphabetic markable boxes into which information from indicia 170 are recorded; marking section 196 includes alphabetic markable boxes into which information from indicia 168 are recorded; and marking section 198 includes markable boxes into which information corresponding to frame size or identifier notation, such as previously described, is inserted.

Additional markable boxes indicated generally at 200 may also be included for indicating timing or other information. For example, if a particular section or portion of a photograph is desired to be reproduced on video tape for a time which is double a reference time (for example, three seconds), the "double" markable box would be checked. Likewise, a caption area 202 is included on markable card 190 for including caption information to be associated with the particular photograph, slide or other visual work.

Thus, the boxes in which each of the numerals or alphabetic letters is confined may be manually marked for communicating information regarding the selected photograph or frame, as will be described below.

With specific reference to FIG. 22, a user may have a photograph 180, here of a farmer's pumpkin patch. However, the user may wish to use only a small portion of this overall photograph. As previously described, the present invention allows the user to select a specific portion of the photograph, denote the precise location of the selected portion, and to record and/or communicate such information. To do so, the user places overlay 150 and base 152 on, or in front of, the photograph 180. The amount of the photograph 180 to be used is determined by which of the apertures 154–160 are positioned over the selected portion of the photograph, recognizing that the illustrated apertures vary in size. In this illustration, aperture 3 (see the Z identifier 176) is used. Assume a user has positioned the aperture to locate or set off the desired portion of the photograph. In this case, the location is easily determined by noting the position of the border or selected reference on the photograph 180 relative to the communication indicia 168, 170 along the borders of base sheet 152. The user merely reads the appropriate notation and then records the same on recording card 190 associated with that photograph. In this instance, assuming the outer edge of photograph 180 is the desired reference (as opposed to, for example, the edge of the imprinted portion of the photograph) the lower, horizontal, border notation is indicated at J while the right side, vertical, notation is at KL. Correspondingly, marking boxes 194 of card 190 would be marked at H while marking boxes 196 would be marked at T. In addition, marking boxes 198 would be marked at 3, corresponding to the selected aperture. Thus, card 190 may be manually marked to permit transfer of information in the same manner as described previously in connection with FIG. 3.

It should be noted that visual aperture 178 is unnecessary if photograph 180 is inserted between overlay 150 and base 152 during use. However, the illustrated approach allows more convenient relative movement between the photograph 180 and framer.

As can be seen in FIG. 22, transparent sections 182, 184 and 186, as well as the transparent portion along the margin of the overlay 150, allow visual observation of the photograph 180 through these areas. In addition, indicia 168, 170 may comprise elongated bars which facilitate alignment of photograph 180 with base 152.

As illustrated in FIGS. 20 and 22, other forms of overlays 150a and 150b, having respective visual apertures 150a–160a and 154b–160b may also be used. For example, overlay 150a could be used in situations where it is desired to surround or place the selected portion of a photograph with a unique border or artwork, as with a star shaped mask. This, overlay 150a has apertures which each have a masked portion in the form of a star. Other masked portions could, for example, comprise artwork or photographs of famous individuals who could be reproduced with the selected portion of the photograph on a video tape. In addition, frame overlay 150b may be used when it is desired to provide a split screen effect. For example, assume an aperture from overlay 150b is used for a first photograph associated with a first card 190 (FIG. 19). The Z or frame identifier indicates the split screen overlay is in use and that only, for example, the right hand half of this photograph is to be included on a video tape to provide one-half of the video frame. The subsequent card 190 associated with another photograph could then be used to designate the portion of this next photograph which provides the other half of a frame of video.

The illustrated positioning and locating mechanism 166 (FIG. 16) permit the convenient substitution of one overlay for any of the other overlays as desired. In addition, such a mechanism locates the overlay relative to the communication indicia 168, 170. The illustrated mechanism 166 includes a pin or post 210 mounted to the base sheet 152. This pin 210 is inserted through an opening 212 in overlay 150 is loosely and releasably secure the overlay to the base. Overlay 150 can be removed from post 210, turned and then replaced on post 210 as desired to place the desired aperture 154–160 in position for use. However, in the illustrated embodiment, overlay 150 may be rotated about post 210 to position the appropriate visual aperture 154-160 in alignment with the window 178 and communication indicia 168, 170. In this case, the overlay 150 is square and the opening 12 is centered in the overlay. Therefore, an equal distance is provided between opening 212 and each corner of the overlay. Moreover, the apertures 54-160 are positioned at the corners of the overlay with their lower outermost corners being a common distance from opening 212. Therefore, as overlay 150 is rotated, the apertures are guided to the desired position relative to indicia 168, 170.

Also, as can be seen in FIG. 16, opening 212 is formed of a pair of intersecting slits each positioned along a diagonal of the overlay 150. In addition, post 210 is generally square in horizontal cross-section with its sides parallel to the right hand and lower edges of base 152 in FIG. 17. Thus, one of the diagonals of post 210 is directed toward the lower right hand corner of the window 178. With this construction, when post 210 is inserted in slits 212, the slits tend to hold the overlay 150 in the correct orientation due to the alignment of the slits with the diagonals of the post 210.

As has been mentioned previously, this apparatus, system and method is useful not only in the application described herein, but also a variety of other areas. Such could include, but need not be limited to, commercial art, business graphics, and any and all other areas in which one wishes to select and/or segregate a portion of a work, locate its position, and record or communicate these for subsequent use.

Having illustrated and described the principles of my invention with reference to one preferred embodiment, it should be apparent to those persons skilled in the art that such invention may be modified in arrangement and detail without departing from such principles.

I claim as my invention all such modifications as come within the true spirit and scope of the following claims:

1. A framer for selecting and defining the position of a portion of a visual work having fixed references such as borders comprising:
   an overlay having a visual aperture defined therein capable of being placed over such visual work and moved relative thereto to place said aperture over a selected portion of said work;
   a base;
   positioning means for orienting the overlay on the base with the aperture in a first position relative to the base;
   the base having communication indicia positioned along at least two regions thereof and disposed at substantial angles relative to each other for denoting the position of the aperture relative to the fixed references on the work when the aperture is in the first position; and
   in which the positioning means comprises means for rotatably coupling the overlay to the base for the overlay having plural visual apertures each positioned for selective rotation to the first position such that the communication indicia denotes the position of the selected aperture in the first position relative to the fixed references on the work.

2. A framer according to claim 1 wherein each aperture is of a different size and which includes means for indicating the selected aperture.

3. A framer according to claim 1 in which the positioning means comprises an upright post mounted to the base, the post having a generally square horizontal cross section with first and second diagonals, the overlay having an opening formed of two intersecting slits each of a length greater than the length of the first and second diagonals.

4. A framer according to claim 3 in which the overlay is a generally square sheet and each visual aperture is positioned generally at a respective corner of the overlay, the slits being generally aligned with the diagonals of the overlay.

5. A framer according to claim 1 in which the overlay is generally square and each visual aperture is positioned generally at a respective corner of the overlay.

6. A framer according to claim 4 in which the base has a visual window defined therein which is positioned to substantially underly the selected visual aperture when the selected visual aperture is in the first position, whereby the base sheet may be moved over the visual work to position the selected visual aperture over a selected portion of the work with the selected portion of the work being visible through both the visual aperture and the visual window.

7. A framer according to claim 6 in which the visual window is sized generally at least as large as the largest visual aperture.

8. A framer according to claim 6 in which the visual apertures are rectangular and are each of a predetermined proportion.

9. A framer according to claim 1 wherein the communication indicia are positioned along axes substantially normal to one another.

10. A framer according to claim 1 wherein at least one of the apertures includes a masked portion.

11. A framer for selecting and defining the position of a portion of a visual work having fixed references such as borders comprising:
    an overlay having a visual aperture defined therein capable of being placed over such visual work and moved relative thereto to place said aperture over such a selected portion of said work;
    a base;
    positioning means for orienting the overlay on the base with the aperture in a first position relative to the base;
    the base having communication indicia positioned along at least two regions thereof and disposed at substantial angles relative to each other for denoting the position of the aperture relative to the fixed references on the work when the aperture is in the first position; and
    in which the base has a visual window defined therein which is positioned to substantially underly the visual aperture when the visual aperture is in the first position, whereby the base may not be moved over the visual work to position the visual aperture over a selected portion of the work with the selected portion of the work being visible through both the visual aperture and the visual window.

12. A framer for selecting and defining the position of a portion of a visual work having fixed references such as borders comprising:
    an overlay having at least two visual apertures defined therein capable of being selectively placed over such visual work and moved relative thereto to place the selected visual aperture over a selected portion of said work;
    a base;

positioning means for locating the overlay on the base with the selected visual aperture in a first position relative to the base, the positioning means comprising means permitting the selective positioning of any of the visual apertures in the first position; and the base having communication indicia positioned along first and second axes substantially normal to each other for denoting the position of the selected aperture relative to the fixed references on the work when the selected aperture is in the first position.

13. A framer according to claim 12 in which the positioning means comprises means for releasably securing the overlay to the base, the framer including plural overlays whereby one overlay may be released by the positioning means for removal and replacement with another of such overlays.

14. A framer according to claim 12 in which the positioning means comprises means for releasably and rotatably mounting the overlay to the base.

15. A framer according to claim 12 in which the base has a first visual window defined therein which is positioned to substantially underly the selected visual aperture when the selected visual aperture is in the first position, whereby the base may be moved over the visual work to position the selected visual aperture over a selected portion of the work with the selected portion of the work being visible through both the visual aperture and the visual window.

16. A framer according to claim 15 in which the overlay and base each comprise a respective sheet.

17. A framer according to claim aperture identifying indicia for indicating the selected aperture.

18. A framer according to claim 17 including a first or X identifier indicia associated with the communication indicia along the first axis, a second or Y identifier indicia associated with the communication indicia along the second axis, and a third or Z identifier indicia associated with the aperture identifying indicia.

19. A framer according to claim 12 wherein at of the apertures includes a masked portion.

* * * * *

UNITED STATES PATENT AND TRADEMARK OFFICE
CERTIFICATE OF CORRECTION

PATENT NO. : 4,827,620
DATED : May 9, 1989
INVENTOR(S) : Glenn G. Gauer

It is certified that error appears in the above-identified patent and that said Letters Patent is hereby corrected as shown below:

Column 6, line 67, "positioned 52" should read --positioned on overlay 152--;

Column 8, line 58, "permit" should read --permits--;

Column 9, line 5, "12" should read --212--;

Column 9, line 8, "54-160" should read --154-160--;

Column 10, claim 11, line 55, "may not be" should read --may be--;

Column 12, claim 17, line 12, "claim aperture" should read --claim 15 including apeture--; and Column 12, claim 19, line 20, "wherein at of" should read --wherein at least one of--.

UNITED STATES PATENT AND TRADEMARK OFFICE
CERTIFICATE OF CORRECTION

PATENT NO. : 4,827,620

DATED : May 9, 1989

INVENTOR(S) : Glenn G. Gauer

It is certified that error appears in the above-identified patent and that said Letters Patent is hereby corrected as shown below:

Column 12, claim 19, line 20, "wherein at of" should read --wherein at least one of --.

Signed and Sealed this

Thirtieth Day of November, 1993

*Attest:*

BRUCE LEHMAN

*Attesting Officer*     *Commissioner of Patents and Trademarks*